US012675416B2

(12) United States Patent
   Kwok

(10) Patent No.: US 12,675,416 B2
(45) Date of Patent: *Jul. 7, 2026

(54) COMPRESSION OF LOGICAL-TO-PHYSICAL ADDRESS INDIRECTION TABLE ON SOLID-STATE DRIVES

(71) Applicant: SK Hynix NAND Product Solutions Corp., Rancho Cordova, CA (US)

(72) Inventor: Zion Kwok, Burnaby (CA)

(73) Assignee: SK Hynix Nand Product Solutions Corp, Rancho Cordova, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 18/732,494

(22) Filed: Jun. 3, 2024

(65) Prior Publication Data

US 2024/0330200 A1     Oct. 3, 2024

Related U.S. Application Data

(63) Continuation of application No. 18/127,271, filed on Mar. 28, 2023, now Pat. No. 12,038,848.

(51) Int. Cl.
G06F 12/1009 (2016.01)

(52) U.S. Cl.
CPC .............................. G06F 12/1009 (2013.01)

(58) Field of Classification Search
None
See application file for complete search history.

(56) References Cited

U.S. PATENT DOCUMENTS

2009/0113121 A1    4/2009    Lee et al.
2012/0203958 A1*   8/2012    Jones .................. G06F 12/0246
                                                711/E12.008
2014/0140136 A1    5/2014    Jung
2016/0070336 A1*   3/2016    Kojima .................. G06F 1/263
                                                711/103

(Continued)

FOREIGN PATENT DOCUMENTS

WO     WO2022193120 A1     9/2022

OTHER PUBLICATIONS

SK Hynix NAND Product Solutions Corp. (dba Solidigm), PCT/US2024/020446, International Search Report and Written Opinion, Jul. 11, 2024, 7 pgs.

(Continued)

*Primary Examiner* — Brian R Peugh

(74) *Attorney, Agent, or Firm* — Morgan, Lewis & Bockius LLP

(57) ABSTRACT

This application is directed to compressing a logical-to-physical (L2P) address indirection table in a memory system of an electronic device. The electronic device determines a plurality of physical addresses corresponding to an ordered sequence of logical addresses. Each logical address corresponds to a distinct physical address. The electronic device identifies a set of most significant bits (MSBs) and a set of least significant bits (LSBs) of each of the plurality of physical addresses and determines a set of data bits based on a plurality of MSB sets including the set of MSBs of each of the plurality of physical addresses. The set of LSBs of each of the plurality of physical addresses and the set of data bits are stored jointly in the L2P address indirection table.

20 Claims, 13 Drawing Sheets

800

Determine a plurality of physical addresses corresponding to an ordered-sequence of logical addresses, each logical address corresponding to a distinct physical address 802

Identify a set of most significant bits (MSBs) and a set of least significant bits (LSBs) of each of the plurality of physical addresses 804

A number of the MSBs remains the same for the plurality of physical addresses 812

A number of the MSBs varies for the plurality of physical addresses 814

Determine a set of data bits based on a plurality of MSB sets including the set of MSBs of each of the plurality of physical addresses 806

The set of data bits has a number of bits that is less than a total number of MSBs in the plurality of physical addresses 810

Check a lookup table to determine the set of data bits based on the combination of the plurality of MSB sets 816

Determine an output value based on a predefined equation and a plurality of input values associated with the set of MSBs of each physical address, and determine the set of data bits from the output value 818

Store the set of LSBs of each of the plurality of physical addresses and the set of data bits jointly in a logical-to-physical (L2P) address indirection table 808

The plurality of physical addresses have 2 physical addresses, and the set of MSBs of each of the plurality of physical addresses has 4 bits, and wherein the set of data bits includes 7 bits 820

The plurality of physical addresses have 3 physical addresses, and the set of MSBs of each of the plurality of physical addresses has 3 bits, and wherein the set of data bits includes 7 bits 822

The set of data bits are stored immediately before the set of LSBs of the plurality of physical addresses in the L2P address indirection table 824

The set of data bits are stored immediately following the set of LSBs of the plurality of physical addresses in the L2P address indirection table 826

In accordance with a predefined data structure, the set of LSBs of the plurality of physical addresses and the set of data bits are stored in two separate memory regions of the L2P address indirection table 828

(56) References Cited

U.S. PATENT DOCUMENTS

2017/0364446 A1    12/2017   Pham et al.
2021/0349655 A1    11/2021   Lin

OTHER PUBLICATIONS

SK Hynix NAND Product Solutions Corp. (dba Solidigm), PCT/US2024/020446, International Preliminary Report on Patentability, Sep. 20, 2025, 6 pgs.

* cited by examiner

400

302A                      302B                      302C

| M1 | 314A |    | M2 | 314B |    | M3 | 314C |

304

10 01010100 00001011 11100011 11111111

34'b00 00000000 00000000 00000000 00000000    306A

34'b11 11111111 11111111 11111111 11111111    306B

34'b00 00000000 00000000 00000000 00000000    308A

34'b10 01111111 11111111 11111111 11111111    308B

316

M1: 000 – 100
M2: 000 – 100
M3: 000 – 100

| M1 | M2 | M3 | Set of Data Bits (SDB) 312 |
|-----|-----|-----|-----|
| 000 | 000 | 000 | 000 0000 |
| 000 | 000 | 001 | 000 0001 |
| ... | ... | ... | ... |
| 100 | 100 | 011 | 111 1011 |
| 100 | 100 | 100 | 111 1100 |

318

$SDB = f(M1, M2, M3)$

450

| M1 (3 bits) | Entry1 (31 bits) <u>314A</u> | <u>404A</u> |
| M2 (3 bits) | Entry2 (31 bits) <u>314B</u> | <u>404B</u> |
| M3 (3 bits) | Entry3 (31 bits) <u>314C</u> | <u>404C</u> |

102 bits 310
(100 bits)

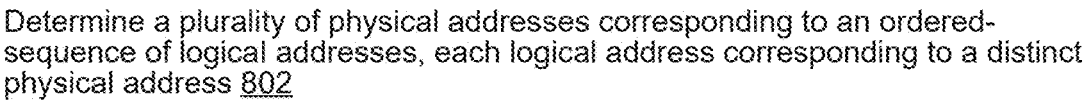

800

Determine a plurality of physical addresses corresponding to an ordered-sequence of logical addresses, each logical address corresponding to a distinct physical address 802

Identify a set of most significant bits (MSBs) and a set of least significant bits (LSBs) of each of the plurality of physical addresses 804

> A number of the MSBs remains the same for the plurality of physical addresses 812

> A number of the MSBs varies for the plurality of physical addresses 814

Determine a set of data bits based on a plurality of MSB sets including the set of MSBs of each of the plurality of physical addresses 806

> The set of data bits has a number of bits that is less than a total number of MSBs in the plurality of physical addresses 810

> Check a lookup table to determine the set of data bits based on the combination of the plurality of MSB sets 816

> Determine an output value based on a predefined equation and a plurality of input values associated with the set of MSBs of each physical address, and determine the set of data bits from the output value 818

Store the set of LSBs of each of the plurality of physical addresses and the set of data bits jointly in a logical-to-physical (L2P) address indirection table 808

> The plurality of physical addresses have 2 physical addresses, and the set of MSBs of each of the plurality of physical addresses has 4 bits, and wherein the set of data bits includes 7 bits 820

> The plurality of physical addresses have 3 physical addresses, and the set of MSBs of each of the plurality of physical addresses has 3 bits, and wherein the set of data bits includes 7 bits 822

> The set of data bits are stored immediately before the set of LSBs of the plurality of physical addresses in the L2P address indirection table 824

> The set of data bits are stored immediately following the set of LSBs of the plurality of physical addresses in the L2P address indirection table 826

> In accordance with a predefined data structure, the set of LSBs of the plurality of physical addresses and the set of data bits are stored in two separate memory regions of the L2P address indirection table 828

Figure 8

COMPRESSION OF LOGICAL-TO-PHYSICAL ADDRESS INDIRECTION TABLE ON SOLID-STATE DRIVES

RELATED APPLICATION

This application is a continuation of U.S. patent application Ser. No. 18/127,271, filed Mar. 28, 2023, titled "Compression of Logical-to-Physical Address Indirection Table on Solid-State Drives," now U.S. Pat. No. 12,038,848, which is incorporated by reference in its entirety.

TECHNICAL FIELD

This application relates generally to memory management including, but not limited to, methods, systems, and non-transitory computer-readable media for compressing address data in a logical-to-physical (L2P) indirection table of a memory system (e.g., solid-state drive).

BACKGROUND

Memory is applied in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). An SSD typically has an address indirection table that maps logical addresses associated with a host device to physical addresses of NAND flash memory in the SSD. Each memory unit of the SSD needs to be addressable in the address indirection table. Memory units can be grouped into larger block sizes and addressed with fewer addresses. However, as a capacity of the SSD increases, its memory units are addressed with more physical addresses, and more bits are inevitably needed to represent each physical address of the SSD. Long physical addresses require a large storage space for the address indirection table. More importantly, excessively long addresses cannot be accessed within a burst length (e.g., 64 bytes), thereby demanding excessive power and access time overheads during the course of reading from or writing into memory units in the SSD. It would be beneficial to compress physical addresses stored in an address indirection table of an SSD to both conserve the storage space of the table and enhance memory access performance.

SUMMARY

Various embodiments of this application are directed to methods, systems, devices, non-transitory computer-readable media for compressing address data stored in a logical-to-physical address indirection table. A physical address of a memory system has a limited range determined based on a capacity of the memory system. Due to the limited range of the physical addresses, most significant bits (MSBs) of a set of physical addresses are stored jointly as a set of data bits. Remaining bits of the set of physical addresses are stored separately without compression. The set of data bits has a number of bits that is less than a total number of MSBs of the set of physical addresses, and a memory space used to store the address indirection table is reduced accordingly. Additionally, in some embodiments, this enables the SSD to pack multiple physical addresses into a 64-byte (64B) codeword including error correction codes (ECCs). The 64B codeword is accessible by a burst read or write, which allows the use of a 64-byte cache line and reduces a dynamic random-access memory (DRAM) access latency and power consumption.

In one aspect, a method is implemented at an electronic device to compress an L2P address indirection table on a memory system (e.g., solid-state drives). The method includes determining a plurality of physical addresses corresponding to an ordered sequence of logical addresses. Each logical address corresponds to a distinct physical address. The method includes identifying a set of most significant bits (MSBs) and a set of least significant bits (LSBs) of each of the plurality of physical addresses and determining a set of data bits based on a plurality of MSB sets including the set of MSBs of each of the plurality of physical addresses. The method includes storing the set of LSBs of the plurality of physical addresses and the set of data bits jointly in a logical-to-physical (L2P) address indirection table.

In some embodiments, for each of the plurality of physical addresses, the set of MSBs has a first number of bits, and the set of LSBs has a second number of remaining bits distinct from the set of MSBs in the respective physical address. Further, in some embodiments, the first number remains the same for each the plurality of physical addresses. Alternatively, in some embodiments, the plurality of physical addresses includes at least a first physical address and a second physical address. The first physical address has a first set of MSBs, and the second physical address has a second set of MSBs. A number of data bits in the first set of MSBs is distinct from a number of data bits in the second set of MSBs.

In some embodiments, the set of data bits is determined from the plurality of MSB sets based on a lookup table. Alternatively, in some embodiments, the set of data bits is determined from the plurality of MSB sets based on an equation.

In some embodiments, the set of LSBs of each of the plurality of physical addresses and the set of data bits are stored as a set of compressed address data, and the method further includes accessing the set of compressed address data and corresponding integrity data in a burst write or a burst read.

In another aspect, some implementations include an electronic device that includes one or more processors and memory having instructions stored thereon, which when executed by the one or more processors cause the processors to perform any of the above methods to compress an L2P address indirection table on a memory system (e.g., solid-state drives).

In yet another aspect, some implementations include a non-transitory computer readable storage medium storing one or more programs. The one or more programs include instructions, which when executed by one or more processors cause the processors to implement any of the above methods to compress an L2P address indirection table on a memory system (e.g., solid-state drives).

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 8 is a flow diagram of a method for compressing addresses stored in an L2P address indirection table, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
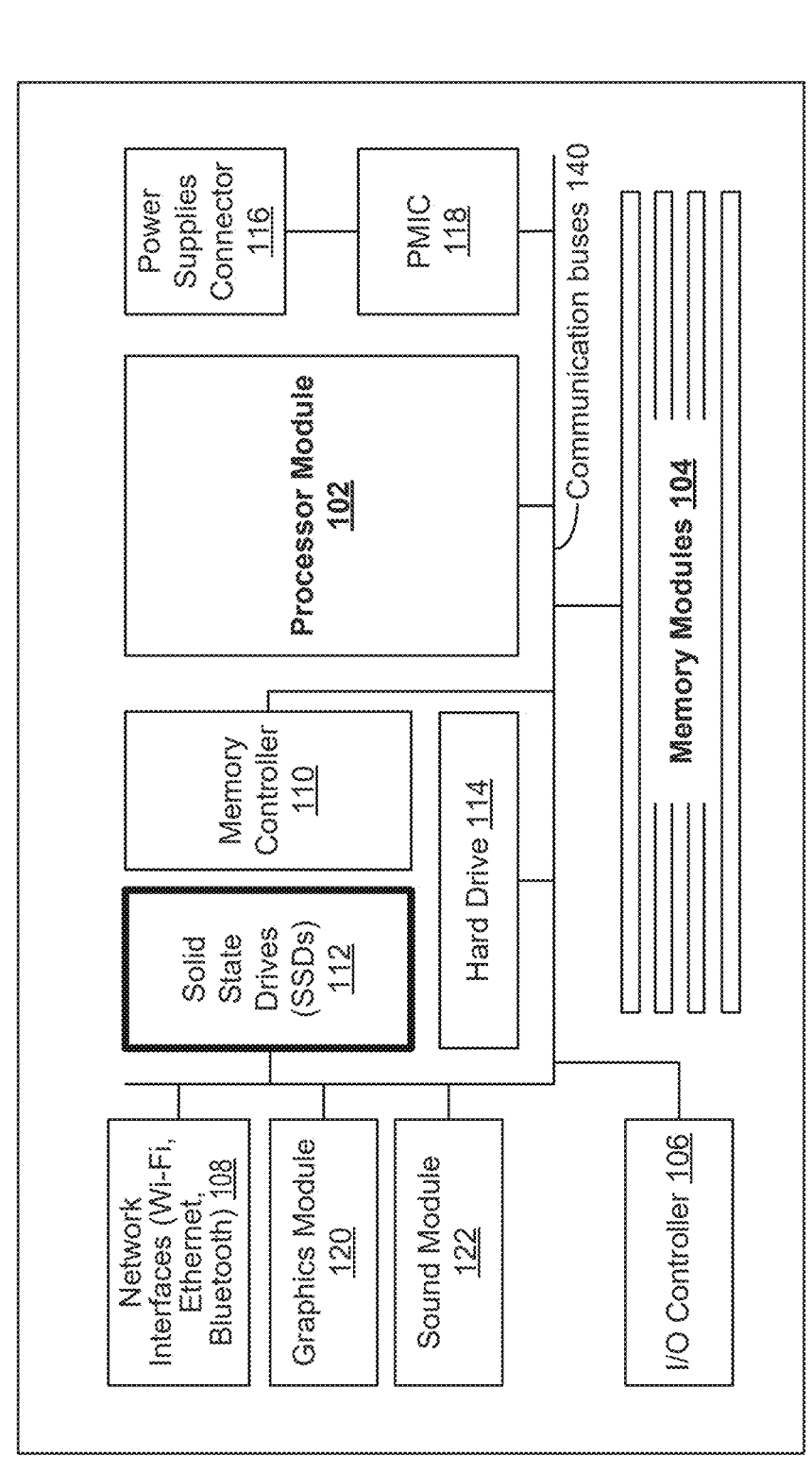
FIG. 1 is a block diagram of an example system module in a typical electronic device in accordance with some embodiments.

FIG. 1 is a block diagram of an example system module 100 in a typical electronic device in accordance with some embodiments. The system module 100 in this electronic device includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a track-pad) via a universal serial bus interface. In some embodiments, the network interfaces 108 includes one or more interfaces for Wi-Fi, Ethernet and Bluetooth networks, each allowing the electronic device to exchange data with an external source, e.g., a server or another electronic device. In some embodiments, the communication buses 140 include circuitry (sometimes called a chipset) that interconnects and controls communications among various system components included in system module 100.

In some embodiments, the memory modules 104 include high-speed random-access memory, such as DRAM, static random-access memory (SRAM), double data rate (DDR) dynamic random-access memory (RAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, solid state drives (SSDs) 112, a hard disk drive (HDD) 114, power management integrated circuit (PMIC) 118, a graphics module 120, and a sound module 122. The memory controller 110 is configured to control communication between the processor module 102 and memory components, including the memory modules 104, in the electronic device. The SSDs 112 are configured to apply integrated circuit assemblies to store data in the electronic device, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic device. The graphics module 120 is configured to generate a feed of output images to one or more display devices according to their desirable image/video formats. The sound module 122 is configured to facilitate the input and output of audio signals to and from the electronic device under control of computer programs.

It is noted that communication buses 140 also interconnect and control communications among various system components including components 110-122.

Further, one skilled in the art knows that other non-transitory computer readable storage media can be used, as new data storage technologies are developed for storing information in the non-transitory computer readable storage media in the memory modules 104 and in SSDs 112. These new non-transitory computer readable storage media include, but are not limited to, those manufactured from biological materials, nanowires, carbon nanotubes and individual molecules, even though the respective data storage technologies are currently under development and yet to be commercialized.

Some implementations of this application are directed to compressing physical addresses in an L2P address indirection table of a memory system (e.g., SSDs 112 of the system module 100 in FIG. 1). The physical addresses stored in the L2P address indirection table are divided into a plurality of address sets (e.g., 502 in FIG. 5A). Each address set includes a plurality of physical addresses (e.g., 3 physical addresses) corresponding to an ordered sequence of logical addresses. Each logical address corresponds to a distinct physical address. Each of the plurality of physical addresses includes a set of MSBs and a set of LSBs that are optionally complementary to the set of MSBs in the respective physical address. The set of LSBs of each of the plurality of physical addresses is stored into the L2P address indirection table. A plurality of sets of MSBs correspond to the plurality of physical addresses are combined with one another to form a set of data bits (312 in FIG. 3B or 4B). The set of data bits is stored into the L2P address indirection table jointly with the set of LSBs of each physical address. The set of data bits has a number of bits that is less than a total number of MSBs in the plurality of physical addresses. By these means, when stored into the memory system, the plurality of physical addresses are compressed by one or more data bits, thereby conserving memory space of a cache or DRAM module applied to store the L2P address indirection table and enhancing memory access performances.

Figure 2:
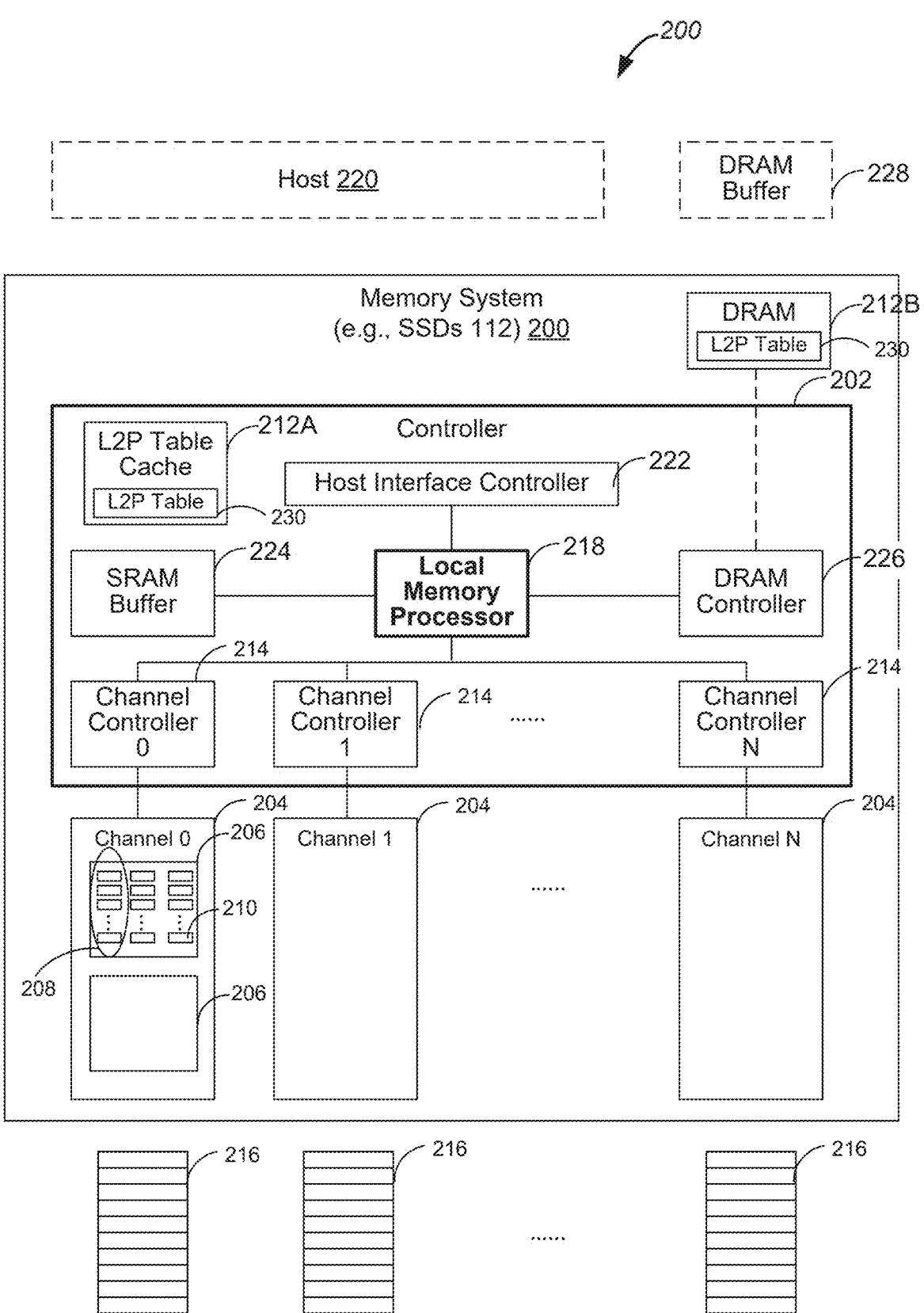
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 further includes a controller 202 and a plurality of memory channels 204. Each memory channels 204 includes a plurality of memory cells. The controller 202 is configured to execute firmware level software to bridge the plurality of memory channels 204 to the host device 220.

Each memory channel 204 includes on one or more memory packages 206 (e.g., two memory chips, two memory dies). In an example, each memory package 206 corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory system 200 includes a single-level cell (SLC) SSD, and each memory cell stores a single data bit. In some embodiments, the memory system 200 includes a multi-level cell (MLC) SSD, and each memory cell stores 2 data bits. In an example, each memory cell of a triple-level cell (TLC) SSD stores 3 data bits. In another example, each memory cell of a quad-level cell (QLC) SSD stores 4 data bits. In yet another example, each memory cell of a penta-level cell (PLC) SSD stores 5 data bits. In some embodiments, each memory cell can store any suitable number of data bits. Compared with the non-SLC SSD (e.g., MLC SSD, TLC SSD, QLC SSD, PLC SSD), the SLC SSD operates with a higher speed, a higher reliability, and a longer lifespan, and however, has a lower device density and a higher price.

Each memory channel 204 is coupled to a respective channel controller 214 configured to control internal and external requests to access memory cells in the respective memory channel 204. In some embodiments, each memory package 206 (e.g., each memory die) corresponds to a respective queue 216 of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory system 200 corresponds to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228 that is main memory used by the processor module 102 (FIG. 1). The local memory processor 218 of the controller 202 accesses the DRAM buffer 228 via the host interface controller 222.

In some embodiments, the memory system 200 includes an SSD having an L2P address indirection table 230 that stores physical addresses for a set of logical addresses, e.g., a logic block address (LBA). In some embodiments, the L2P address indirection table 230 is stored in an L2P table cache 212A included in the controller 202. Alternatively, in some embodiments, the memory system 200 includes a DRAM module 212B, and the L2P address indirection table 230 is stored in the DRAM module 212B. The local memory processor 218 of the controller 202 accesses the DRAM module 212B via a DRAM controller 226. In an example, the SSD has a memory capacity of 32 terabytes (i.e., 32 TB) organized into a plurality of memory sectors, and each memory sector stores 4096 bytes (i.e., 4 KB) and is individually addressable. The SSD includes 8 billion memory sectors identified by 8 billion physical addresses. At least 33 data bits are needed to uniquely represent each and every individual physical address of the SSDs having 8 billion physical addresses. If the physical addresses are successively numbered starting from 0, a corresponding decimal value of the 33 data bits does not reach or go beyond 8 billion. Further, in some embodiments, the SSD includes NAND memory cells, and reserves extra memory space by overprovisioning. For example, overprovisioning is 25%, and the SSD has 10 billion memory sectors to be identified by 10 billion unique physical addresses. At least 34 data bits are needed to uniquely identify each and every individual physical address of the SSD having 10 billion physical addresses. If the physical addresses are successively numbered starting from 0, a corresponding decimal value of the 34 data bits does not reach or go beyond 10 billion, leaving the decimal values 10-17 billion unused.

Various implementations of this application are directed to compressing address data stored in the L2P address indirection table 230. MSBs of a set of physical addresses are stored jointly using a set of bits, which has less bits than the MSBs of the set of physical addresses. Remaining bits (i.e., remaining LSBs) of the set of physical addresses are stored without compression. For example, 8 MSBs of two 34b physical addresses are stored jointly using 7 data bits. On average, each physical address is stored in 33.5 bits in the L2P address indirection table 230. In another example, 9 MSBs of three 34b physical addresses are stored jointly using 7 data bits. On average, each physical address is stored in 33.333 bits in the L2P address indirection table 230.

Figure 3A:
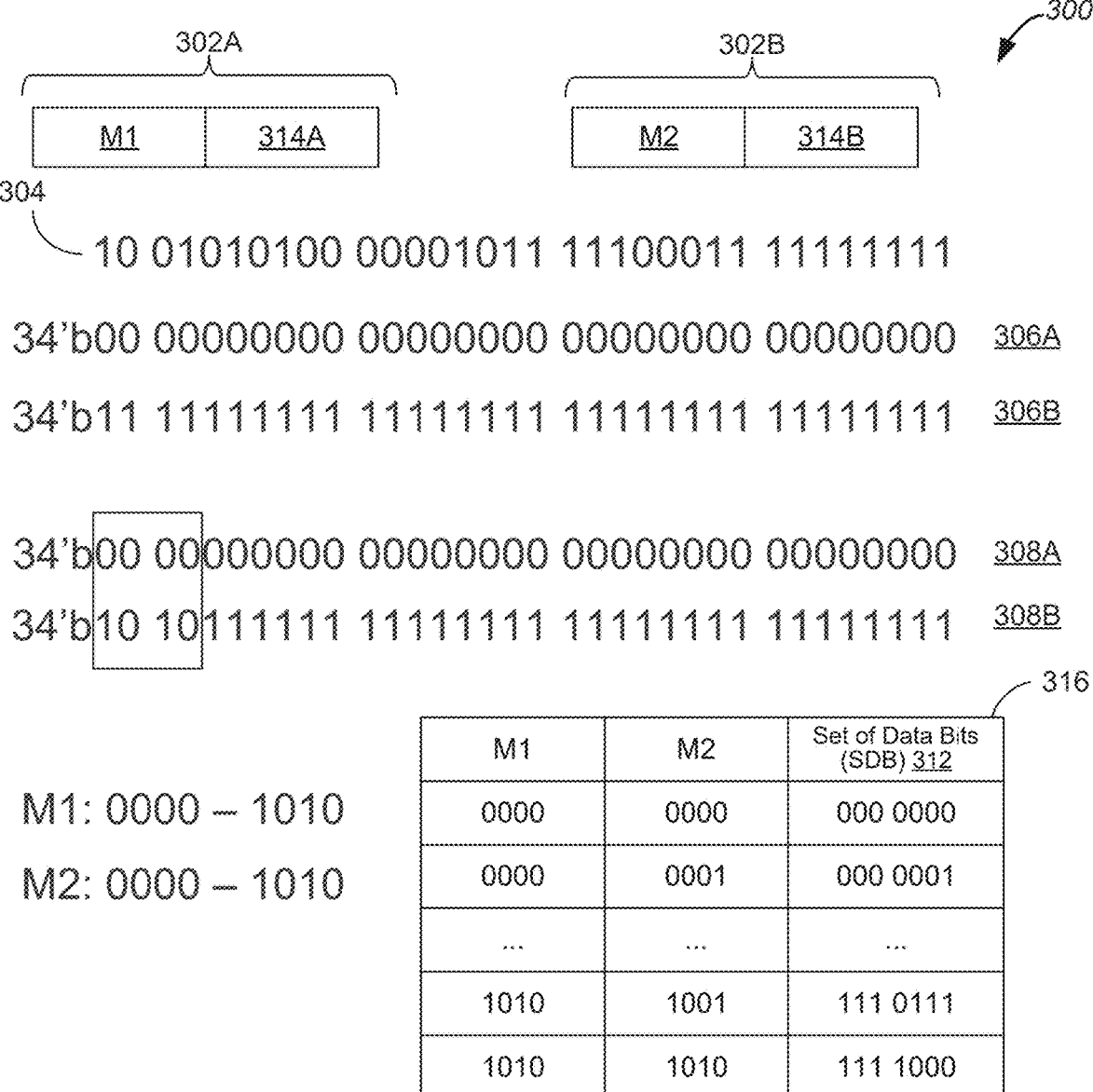
FIG. 3A is a diagram illustrating an example process of compressing two 34-bit (34b) physical addresses to be stored in an L2P address indirection table, in accordance with some embodiments.
Figure 3B:
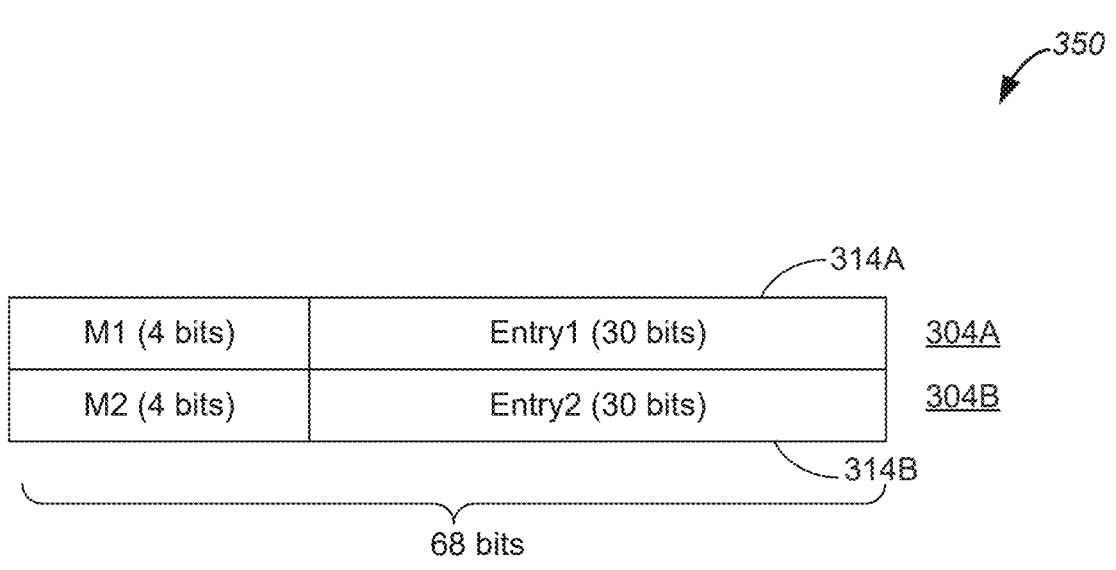
FIG. 3B is a diagram of example data structures of two 34b addresses and corresponding compressed address data, in accordance with some embodiments.
Figure 3B:
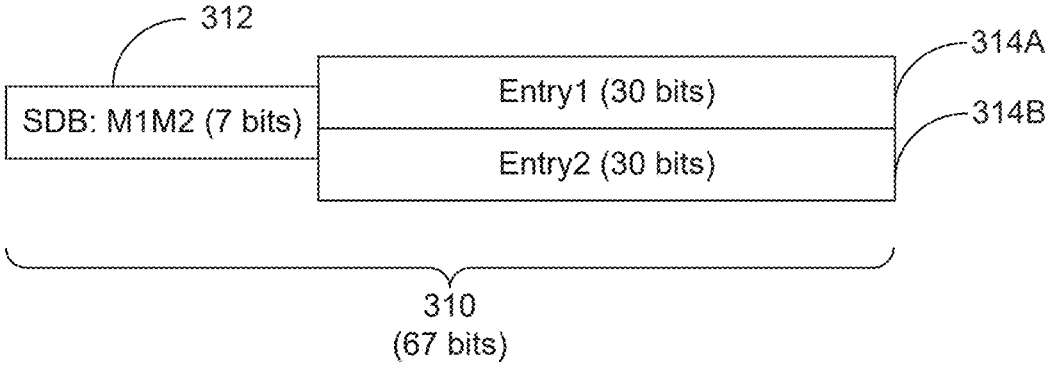

FIG. 3A is a diagram illustrating an example process 300 of compressing two 34-bit (34b) physical addresses 302A and 302B to be stored in an L2P address indirection table 230, in accordance with some embodiments, and FIG. 3B is a diagram of example data structures 350 of two 34b physical addresses 302A and 302B and corresponding compressed address data 310, in accordance with some embodiments. The process 300 compresses two 34b physical addresses 302A and 302B by 1 bit (i.e., compresses each physical address by 0.5 bit on average). A memory system 200 has a memory capacity and includes a plurality of addressable memory units (e.g., 4 KB memory sectors). Each addressable memory unit is addressed by a unique physical address 302. In an example, the memory system

200 requires 10 billion unique physical addresses 302 to address the plurality of addressable memory units. If the 10 billion unique physical addresses 302 are successively numbered using integers (0-9999999999), the largest integer used for the physical addresses 302 corresponds to a first 34b binary number 304. As such, each physical address 302 is defined with an address word having at least 34 bits.

In some embodiments, a 34b address word is defined in a first binary data range between two binary numbers 306A and 306B (i.e., between 00 00000000 00000000 00000000 to 11 11111111 11111111 11111111), providing 17.179869184 billion distinct physical addresses. Alternatively, in some embodiments, the smallest integer used to identify the physical addresses 302 is equal to a second 34b binary number 308A corresponding to a decimal value of 0, and the largest integer used to identify the physical addresses 302 does not exceed a third 34b binary number 308B. The third 34b binary number 308B corresponds to a decimal value of 11.811160063 billion, which is greater than 10 billion. Under these circumstances, the highest four bits (i.e., 4 MSBs) of the physical addresses 302 stay between 0000 and 1010 and do not reach 1011 or above.

Each physical address 302 has a set of most significant bits (MSBs) and a set of least significant (LSBs). The MSBs include a first number of highest bits of the physical address 302, and the LSBs include a second number of lowest bits of the physical address 302. In some embodiments, the MSBs and the LSBs share a subset of address bits. In some embodiments, the physical address 302 includes more bits than a combination of the MSBs and the LSBs. In some embodiments, the set of MSBs has the first number of bits, and the second number of bits of the set of LSBs correspond to remaining bits distinct from the set of MSBs in the respective physical address 302. Stated another way, a total number of bits of each physical address 302 is equal to a sum of the first number and the second number, and the MSBs and the LSBs are complementary to each other in the physical address 302. In an example, the first physical address 302A includes a set of MSBs M1 having 4 bits and a set of LSBs 314A complementary to the set of MSBs M1, and the second physical address 302B includes a set of MSBs M2 having 4 bits and a set of LSBs 314B complementary to the set of MSBs M2. Additionally, in some embodiments, memory units of the memory system 200 are addressed by 10 billion unique physical addresses 302, and four MSBs (e.g., M1, M2) of each physical address 302 stay between 0000 and 1010 and do not reach 1011 or above.

Referring to FIG. 3B, in some embodiments, two physical addresses 302A and 302B are stored jointly as compressed address data 310 rather than individually as two 34b address words 304A and 304B. The compressed address data 310 includes a set of data bits 312, the set of LSBs 314A of the first physical address 302A, and the set of LSBs 314B of the second physical address 302B. The set of data bits 312 is determined based on the MSBs M1 and M2 of the physical addresses 302A and 302B and stored in place of the MSBs M1 and M2. In some embodiments, the set of data bits 312 has a number of bits that is less than a total number of bits in MSBs M1 and M2 in the physical addresses 302A and 302B. Specifically, the set of data bits 312 has 7 bits, which is 1 bit less than 8 total bits of the MSBs M1 and M2 of the physical addresses 302A and 302B.

Referring to FIG. 3A, in some embodiments, a lookup table 316 is applied to convert the set of MSBs M1 of the first physical address 302A and the set of MSBs M2 of the second physical address 302B to the corresponding set of data bits 312. A combination of the set of MSBs M1 of the first physical address 302B and the set of MSBs M2 of the second physical address 302B is identified in the lookup table 316. The lookup table 316 is checked to determine the set of data bits 312 based on the combination of the set of MSBs M1 and the set of MSBs M2. For example, when the set of MSBs M1 is 0000 and the set of MSBs M2 is 0001, the set of data bits 312 is 000 0001. In another example, when the set of MSBs M1 is 1010 and the set of MSBs M2 is 1010, the set of data bits 312 is 111 1000.

In some embodiments, memory units of the memory system 200 are addressed by 10 billion unique physical addresses 302, and the set of MSBs M1 and the set of MSBs M2 do not go beyond 1010. Each of the set of MSBs M1 and the set of MSBs M2 ranges from 0000 to 1010, corresponding to 11 decimal values. The set of MSBs M1 and the set of MSBs M2 form 121 distinct combinations. In some embodiments, the set of data bits 312 ranges from 000 0000 to 111 1000. Alternatively, in some embodiments, the 121 combinations of the set of MSBs M1 and the set of MSBs M2 are not represented by successive binary values between 000 0000 and 111 1000. In accordance with the lookup table 316, each of the combinations of the set of MSBs M1 and the set of MSBs M2 is uniquely associated with a respective distinct binary value, e.g., between 000 0000 and 111 1111. No two distinct combinations of the set of MSBs M1 and the set of MSBs M2 are associated with the same set of data bits 312, and no two distinct sets of data bits 312 are associated with the same combination of the set of MSBs M1 and the set of MSBs M2.

Alternatively, in some embodiments, a predefined equation 318 is applied to convert the set of MSBs M1 of the first physical address 302A and the set of MSBs M2 of the second physical address 302B to the corresponding set of data bits 312. A first input value is determined from the set of MSBs M1 of the first physical address 302A, and a second input value is determined from the set of MSBs M2 of the second physical address 302B. An output value is further determined based on the predefined equation 318, the first input value, and the second input value. The output value is converted to the set of data bits (SDB) 312. The predefined equation 318 is an injective function with respect to the combinations of the set of MSBs M1 and the set of MSBs M2. Stated another way, distinct combinations of the set of MSBs M1 and the set of MSBs M2 are uniquely mapped to the set of data bits 312 using the predefined equation 318. An example of the predefined equation 318 is SDB=M1×11+M2.

Figure 4A:
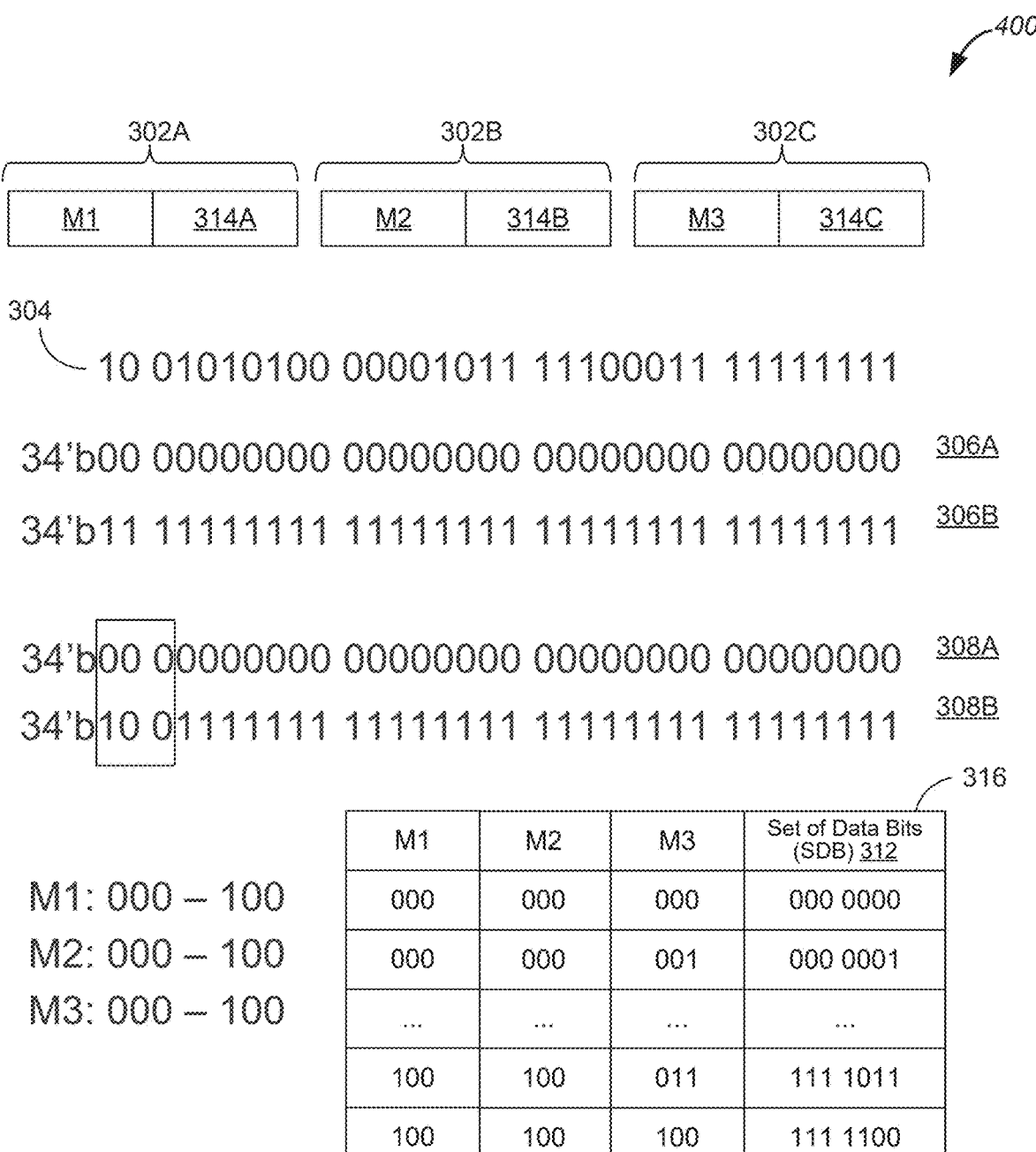
FIG. 4A is a diagram illustrating an example process of compressing three 34b physical addresses to be stored in an L2P address indirection table, in accordance with some embodiments.
Figure 4B:
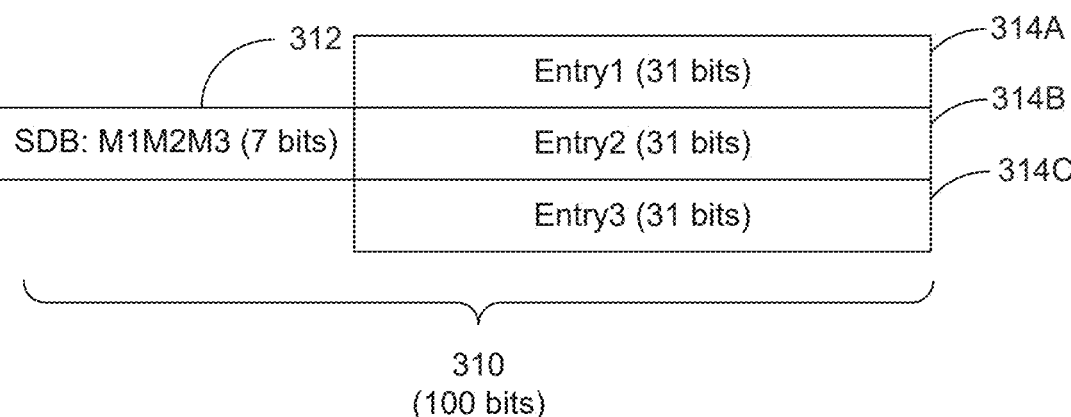
FIG. 4B is a diagram of example data structures of three 34b addresses and corresponding compressed address data, in accordance with some embodiments.

FIG. 4A is a diagram illustrating an example process 300 of compressing three 34b physical addresses 302A, 302B, and 302C to be stored in an L2P address indirection table 230, in accordance with some embodiments, and FIG. 4B is a diagram of example data structures 450 of three 34b physical addresses 302A-302C and corresponding compressed address data 310, in accordance with some embodiments. The process 400 compresses three 34b physical addresses 302A-302C by 2 bits (i.e., compresses each physical address by 0.667 bit on average). If 10 billion unique physical addresses 302 are successively numbered using integers (0-999999999), the largest integer used for the physical addresses 302 corresponds to a first 34b binary number 304. Each physical address 302 is defined and stored in the address indirection table 230 as an address word having at least 34 bits. In some embodiments, a 34b address word is defined in a first binary data range between two binary numbers 306A and 306B (i.e., between 00 00000000 00000000 00000000 to 11 11111111 11111111 11111111), providing 17.179869183 billion distinct physical addresses.

Alternatively, in some embodiments, the smallest integer used to identify the physical addresses 302 is equal to a second 34b binary number 308A corresponding to a decimal value of 0, and the largest integer used to identify the physical addresses 302 does not exceed a third 34b binary number 306B. The third 34b binary number 308B corresponds to a decimal value of 10.737418239 billion, which is greater than 10 billion. Under these circumstances, the highest three bits (3 MSBs) of the physical addresses 302 stay between 000 and 100 and do not reach 101 or above.

For each physical address 302, a set of MSBs includes a first number of highest bits of the physical address 302, and a set of LSBs includes a second number of lowest bits of the physical address 302. In some embodiments, the MSBs and the LSBs are complementary to each other in the physical address 302. For example, the first physical address 302A includes a set of MSBs M1 having 3 bits and a set of LSBs 314A having 31 bits and complementary to the set of MSBs M1, and the second physical address 302B includes a set of MSBs M2 having 3 bits and a set of LSBs 314B having 31 bits and complementary to the set of MSBs M2. The third physical address 302C includes a set of MSBs M3 having 3 bits and a set of LSBs 314C having 31 bits and complementary to the set of MSBs M3. Additionally, in some embodiments, memory units of the memory system 200 are addressed by 10 billion unique physical addresses 302, and 3 MSBs (e.g., M1, M2, M3) of each physical address 302 stay between 000 and 100 and do not reach 101 or above.

Referring to FIG. 4B, in some embodiments, three physical addresses 302A-302C are stored jointly as compressed address data 310 rather than individually as three 34b address words 404A-404C. The compressed address data 310 includes a set of data bits 312, the set of LSBs 314A of the first physical address 302A, the set of LSBs 314B of the second physical address 302B, and the set of LSBs 314C of the third physical address 302C. The set of data bits 312 is determined based on the MSBs M1, M2, and M3 of the physical addresses 302A-302C and stored in place of the MSBs M1, M2, and M3. In some embodiments, the set of data bits 312 has a number of bits that is less than a total number of bits in MSBs M1, M2, and M3 in the physical addresses 302A-302C. Specifically, the set of data bits 312 has 7 bits, which is 2 bits less than 9 total bits of the MSBs M1, M2, and M3 of the physical addresses 302A-302C.

Referring to FIG. 4A, in some embodiments, a lookup table 316 is applied to convert the set of MSBs M1 of the first physical address 302A, the set of MSBs M2 of the second physical address 302B, and the set of MSBs M3 of the third physical address 302C to the corresponding set of data bits 312. A combination of the set of MSBs M1, the set of MSBs M2, and the set of MSBs M3 is identified in the lookup table 316. The lookup table 316 is checked to determine the set of data bits 312 based on the combination of the set of MSBs M1, the set of MSBs M2, and the set of MSBs M3. For example, when the set of MSBs M1 is 000, the set of MSBs M2 is 000, and the set of MSBs M3 is 001, the set of data bits 312 is 000 0001. In another example, when the set of MSBs M1 is 100, the set of MSBs M2 is 100, and the set of MSBs M3 is 100, the set of data bits 312 is 111 1000.

In some embodiments, memory units of the memory system 200 are addressed by 10 billion unique physical addresses 302, and the sets of MSBs M1, M2, and M3 do not go beyond 100. Each of the sets from MSBs M1 to the set of MSBs M2 ranges from 000 to 100, corresponding to 5 decimal values. Three sets of MSBs M1, M2, and M3 form 125 combinations. The resulting set of data bits 312 ranges from 000 000 to 111 1100. Alternatively, in some embodiments, the 125 combinations of the set of MSBs M1, the set of MSBs M2, and the set of MSBs M3 are not represented by successive binary values between 000 0000 and 111 1000. In accordance with the lookup table 316, each of the combinations of the set of MSBs M1, the set of MSBs M2, and the set of MSBs M3 is uniquely associated with a respective distinct binary value of the set of data bits 312, e.g., between 000 0000 and 111 1111. No two distinct combinations of the sets of MSBs M1-M3 are associated with the same set of data bits 312, and no two distinct sets of data bits 312 are associated with the same combination of the set of MSBs M1, the set of MSBs M2, and the set of MSBs M3.

Alternatively, in some embodiments, a predefined equation 318 is applied to convert the set of MSBs M1 of the first physical address 302A, the set of MSBs M2 of the second physical address 302B, and the set of MSBs M3 of the third physical address 302C to the corresponding set of data bits 312. A first input value is determined from the set of MSBs M1 of the first physical address 302A, and a second input value is determined from the set of MSBs M2 of the second physical address 302B. A third input value is determined from the set of MSBs M3 of the third physical address 302C. An output value is further determined based on the predefined equation 318, the first input value, the second input value, and the third input value. The output value is converted to the set of data bits 312. The predefined equation 318 is an injective function with respect to the combinations of the set of MSBs M1, the set of MSBs M2, and the set of MSBs M3. Stated another way, different combinations of the sets of MSBs M1-M3 are uniquely mapped to the set of data bits 312 using the predefined equation 318. An example of the predefined equation 318 is SDB=M1×25+M2×5+M3.

The processes 300 and 400 are applied to compress the physical addresses 302 to be stored in the address indirection table 230, thereby reducing a number of bits stored for the address indirection table 230. For example, referring to FIGS. 3A and 3B, 1 data bit is saved from storing every two 34b address words, and 0.5 bit is saved from storing each 34b address word, which amounts to saving approximately 1.5% of total memory space of a cache 212A or a DRAM module 212B allocated to store the address indirection table 230. Referring to FIGS. 4A and 4B, 2 data bits are saved from storing every three 34b address words, and 0.667 bit is saved from storing each 34b address word, which amounts to saving approximately 2.0% of total memory space of the cache 212A or DRAM module 212B allocated to store the address indirection table 230.

It is noted that a number (A) of physical addresses 302 that are stored jointly in a single address data item (e.g., compressed address data 310) is not limited to 2 (FIGS. 3A and 3B) or 3 (FIGS. 4A and 4B). In each of the physical addresses 302 stored jointly, the set of MSBs includes a respective first number (N1) of MSBs, and the respective first number (N1) is not limited to 4 (FIGS. 3A and 3B) or 3 (FIGS. 4A and 4B). In an example not shown, 8 physical addresses 302 are stored jointly in a single address data item 310, and the set of MSBs of each physical address 302 includes 10 MSBs. There are 80 MSBs in total, and a resulting set of data bits 312 includes 75 bits, saving 5 bits for the 8 physical addresses 302. In other words, 0.625 bit is saved for each physical address 302 on average.

Additionally, in some embodiments, the first number ($N_1$) is the same for all of the physical addresses 302 that are stored jointly in the single address data item 310. Alternatively, in some embodiments, the first number ($N_1$) varies for the physical addresses 302 that are stored jointly in the single address data item 310. For example, at least two of the MSBs M1, M2, and M3 in the lookup table 316 (FIG. 4A) have different numbers of bits.

Figure 5A:
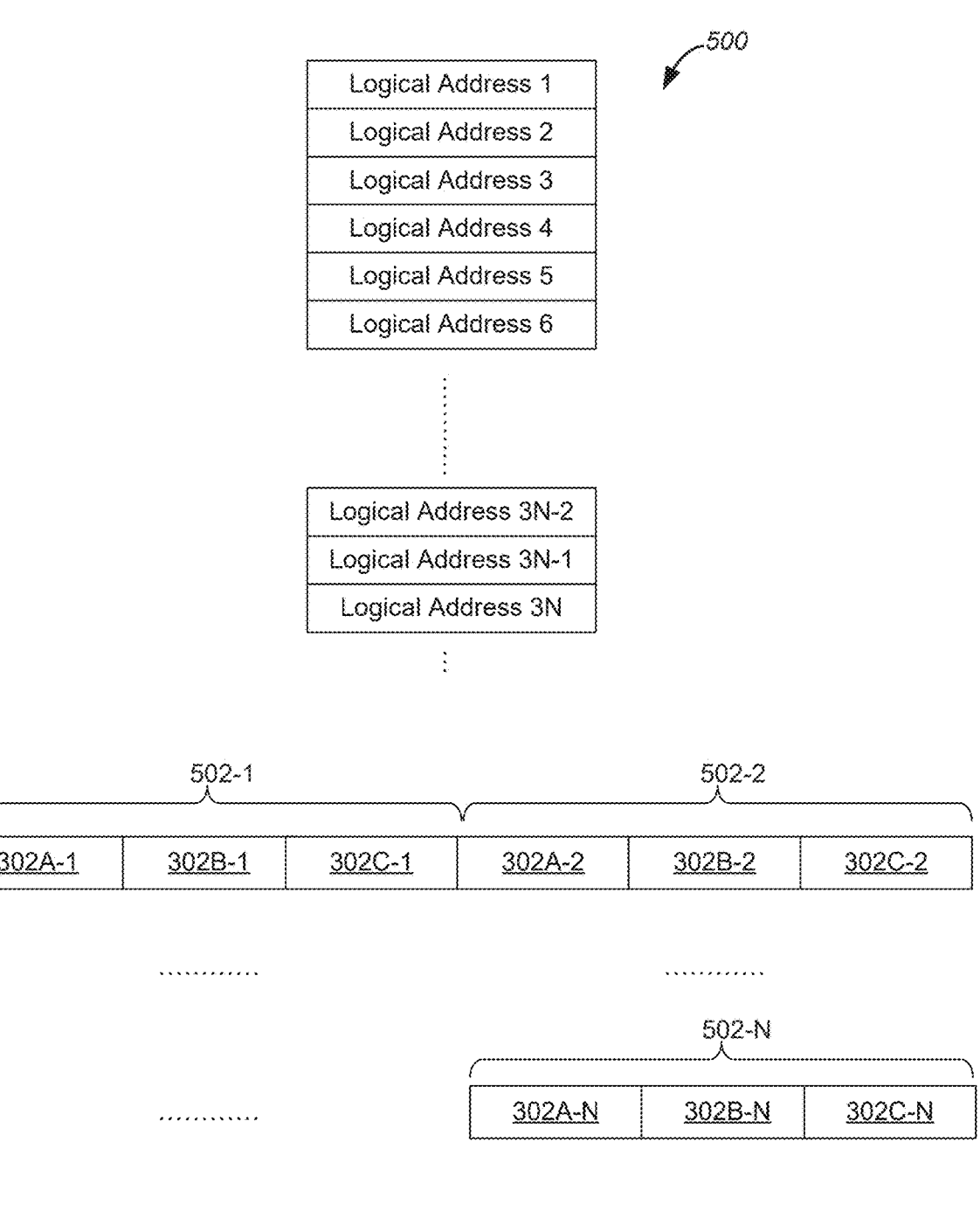
FIG. 5A is a diagram of a sequence of physical addresses corresponding to a sequence of logical addresses, in accordance with some embodiments.
Figure 5B:
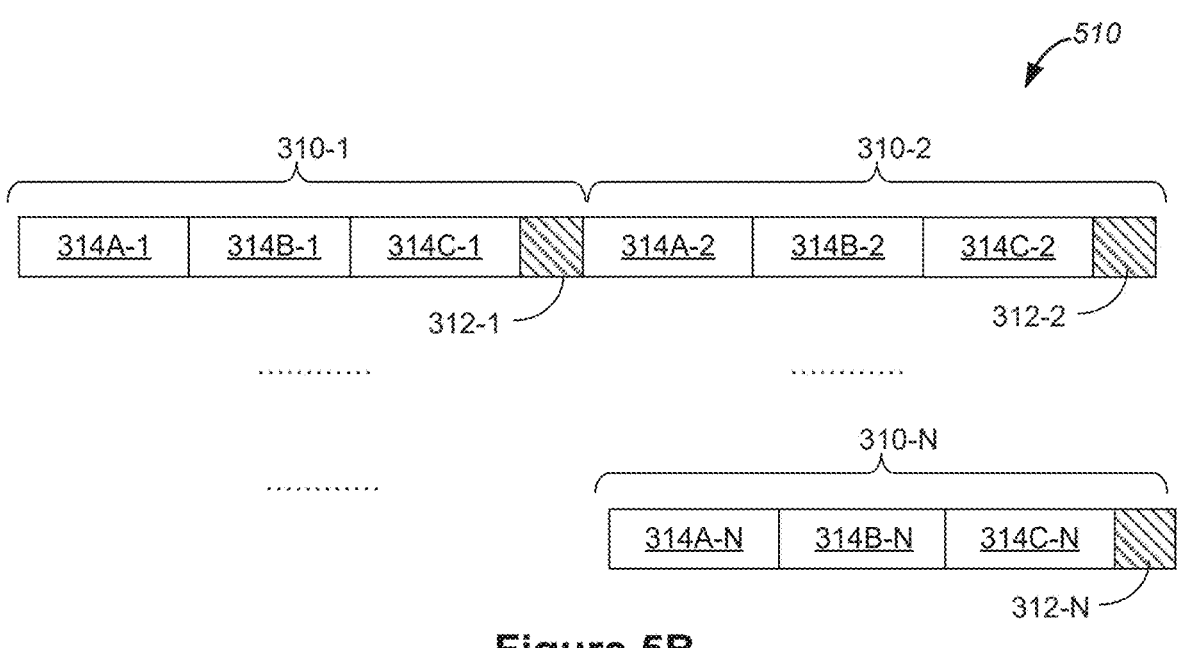
FIG. 5B-5D are diagrams of three example data structures of an L2P address indirection table, in accordance with some embodiments.
Figure 5C:
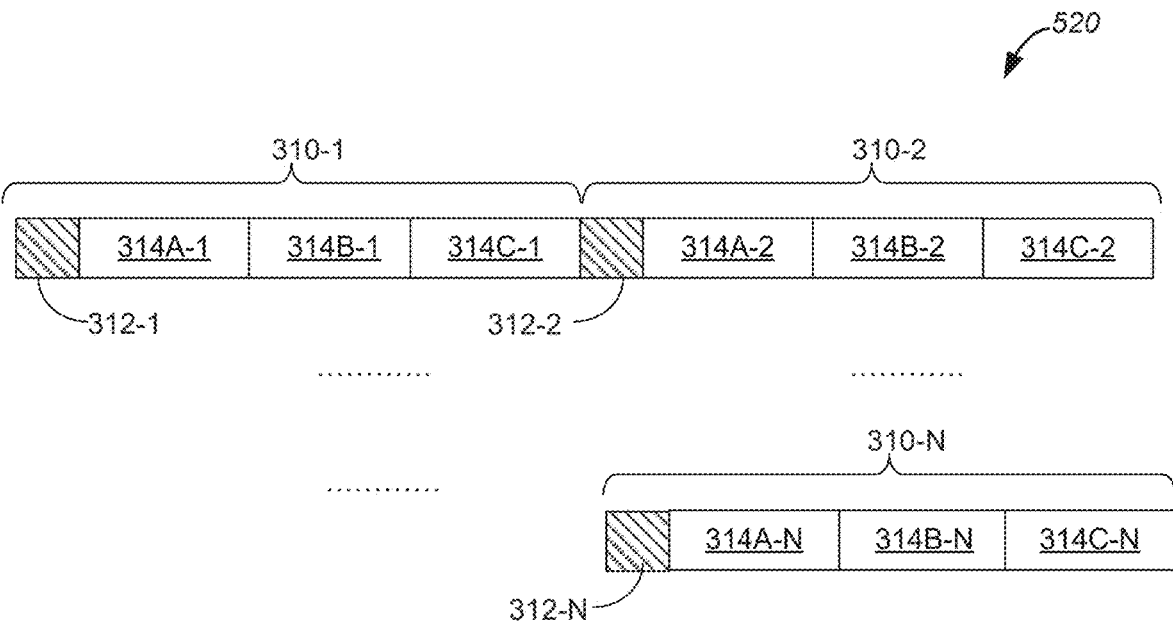
Figure 5D:
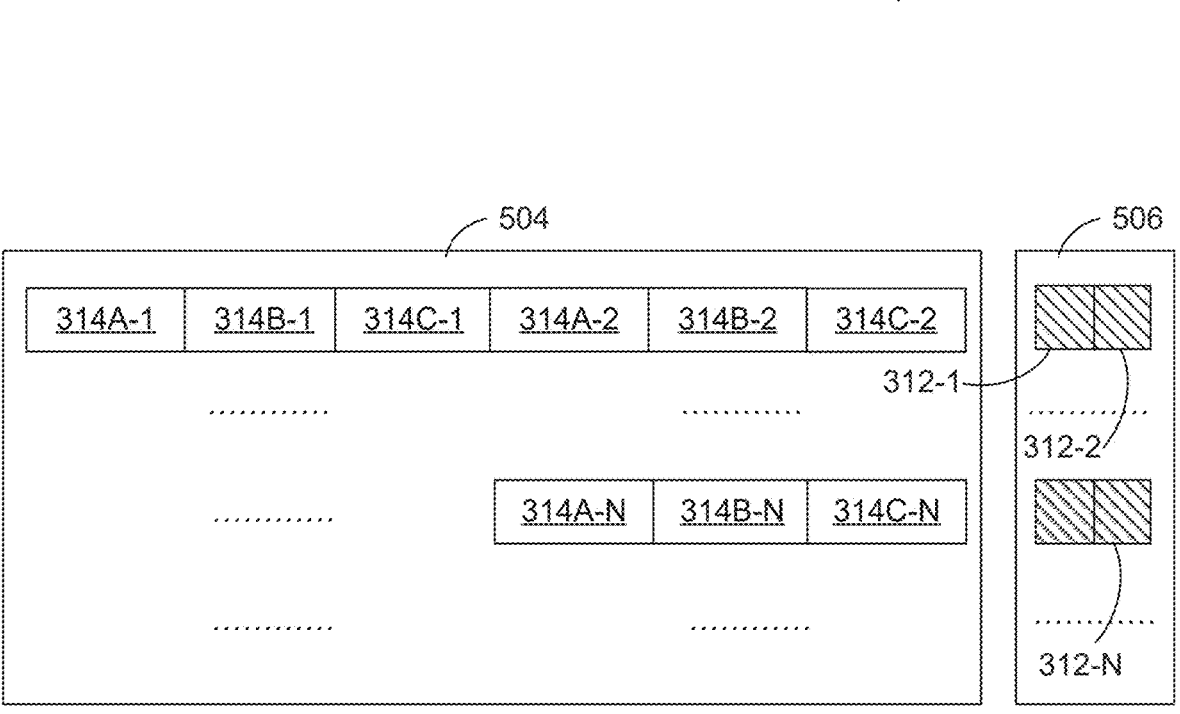

FIG. 5A is a diagram of a sequence of physical addresses 302 corresponding to a sequence of logical addresses 500, in accordance with some embodiments. FIG. 5B-5D are diagrams of three example data structures 510, 520, and 530 of an L2P address indirection table 230, in accordance with some embodiments. The sequence of logical address 500 includes logical addresses 1, 2, 3, . . . , 3N–2, 3N–1, and 3N arranged into an ordered sequence. The sequence of physical addresses 302 includes physical addresses 302A-1, 302B-1, 302C-1, 302A-2, 302B-2, 302C-2, . . . , 302A-N, 302B-N, and 302C-N. Each of the sequence of logical address 500 is mapped successively to a distinct physical address 302 in the sequence of physical addresses 302. The sequence of physical addresses 302 is divided to a plurality of physical address sets 502 (e.g., sets 502-1, 502-2, . . . , and 502-N). Each of the plurality of physical address sets 502 includes a plurality of physical addresses 302 (e.g., 302A-1, 302B-12, and 302C-1) corresponding to an ordered sub-sequence of logical addresses (e.g., logic addresses 1, 2, and 3). Each of the plurality of physical address sets 502 (FIG. 5A) is stored as compressed address data 310 according to a predefined data structure 510, 520, or 530 (FIGS. 5B-5D) in the address indirection table 230.

In some embodiments, every 3 successive physical addresses 302 are grouped to a physical address set 502, and stored as compressed address data 310 (e.g., 310-1, 310-2, and 310-N) in the address indirection table 230. For example, successive physical addresses 302A-N, 302B-N, and 302C-N are grouped into a physical address set 502-N and stored as compressed address data 310-N. The compressed address data 310-N includes a set of data bits 312-N and three sets of LSBs 314A-N, 314B-N, and 314C-N of the physical addresses 302A-N, 302B-N, and 302C-N. The set of data bits 312-N is determined based on a plurality of MSB sets including the set of MSBs M1, M2, and M3 of each of the physical addresses 302A-N, 302B-N and 302C-N.

Referring to FIG. 5B, in some embodiments, in accordance with the data structure 510, the sets of LSBs 314A-N, 314B-N, and 314C-N are stored successively and immediately followed with the set of data bits 312-N for a corresponding physical address set 502-N. Referring to FIG. 5C, in some embodiments, in accordance with the data structure 520, the sets of LSBs 314A-N, 314B-N, and 314C-N are stored successively and immediately follow the set of data bits 312-N for a corresponding physical address set 502-N. Each set of LSBs 314A-N, 314B-N, and 314C-N has 31 bits, and the set of data bits 312-N has 7 bits. The physical addresses 302A-N, 302B-N, and 302C-N have 102 bits in total, and is stored as the compressed address data 310-N having 100 bits.

Referring to FIG. 5D, in some embodiments, in accordance with the data structure 530, for each physical address set 502, the set of LSBs 314 of each of the physical addresses 302 and the set of data bits 312 are stored for the L2P address indirection table 230 in two separate memory regions 504 and 506. The two separate memory regions 504 and 506 are located in a cache 212A or a DRAM module 212B, and include an LSB data region 504 and an MSB data region 506. For the physical address sets 502-1, 502-2, . . . , and 502-N, the corresponding LSB sets 314A-1, 314B-1, 314C-1, 314A-2, 314B-2, 314C-2, . . . , 314A-N, 314A-N, and 314C-N are successively stored in the LSB data region 504, and the sets of data bits 312-1, 312-2, . . . , and 312-N are successively stored in the MSB data region 506. Each set of LSBs 314 has 31 bits, and each set of data bits 312 has 7 bits. For each physical address set 502, three physical addresses 302 have 102 bits in total, and are stored as the compressed address data 310 having 100 bits that are separately stored in the two separate memory regions 504 and 506.

Figure 6A:
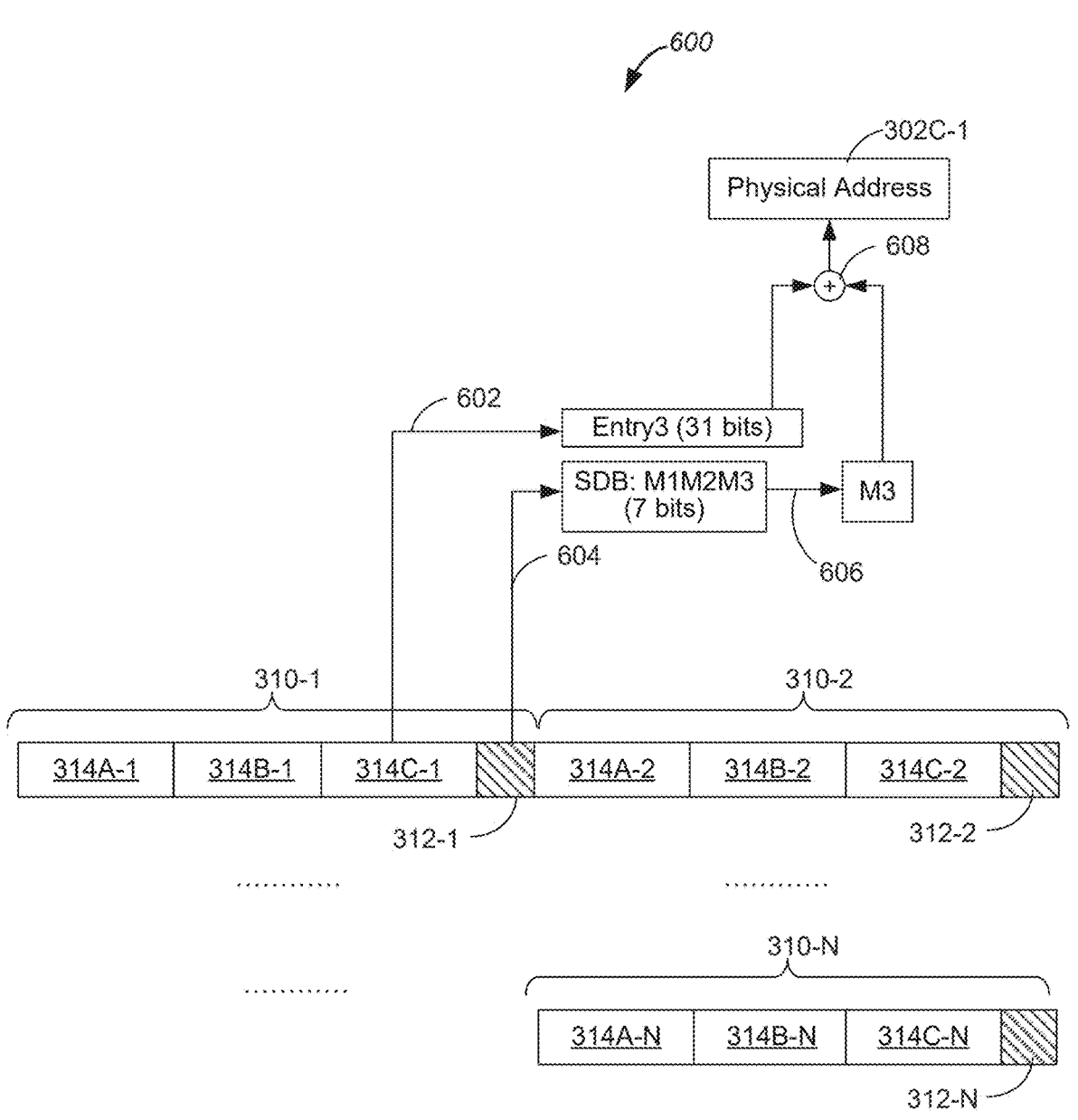
FIG. 6A is a diagram illustrating a process of extracting a physical address from an L2P address indirection table, in accordance with some embodiments.
Figure 6B:
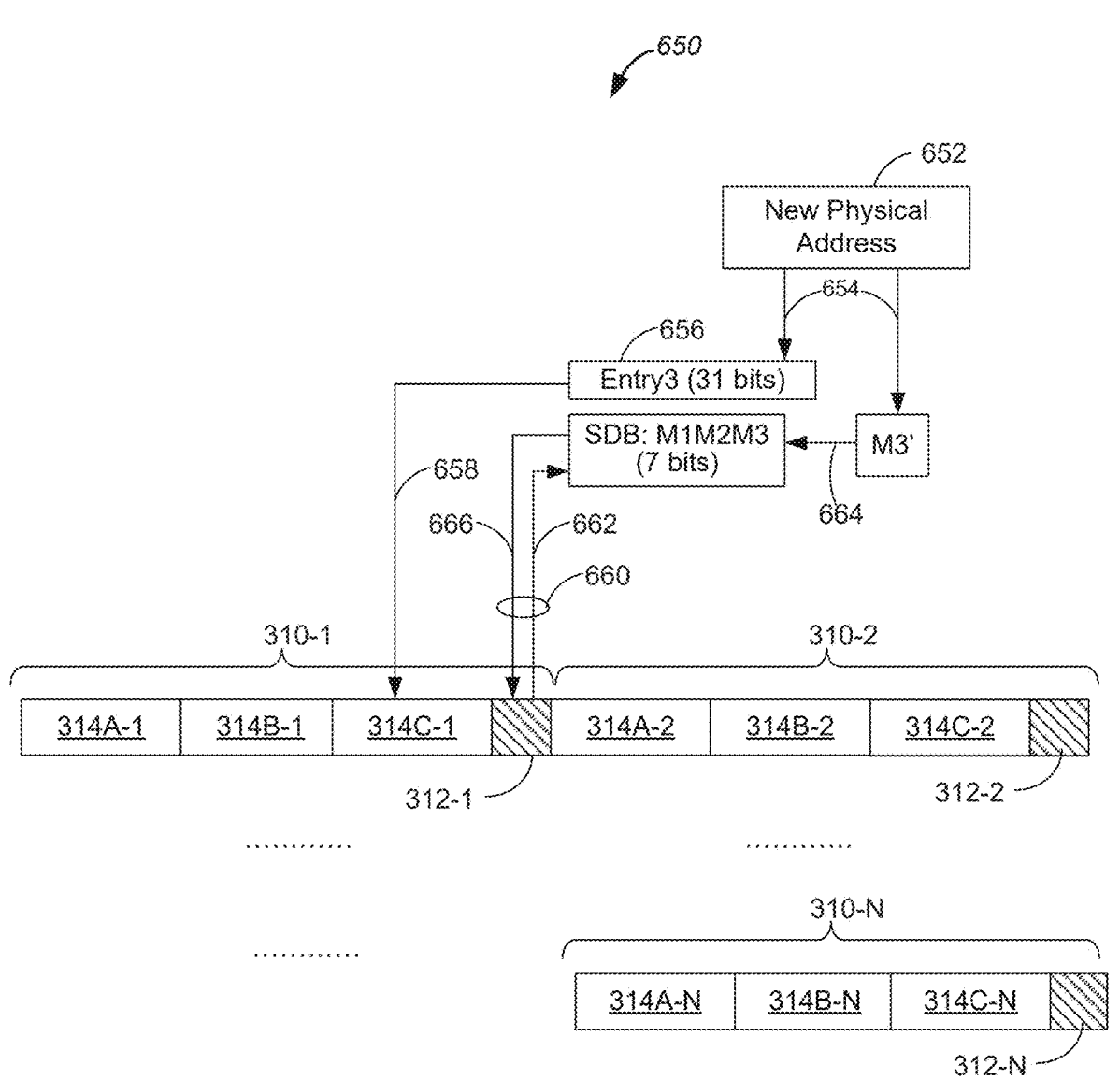
FIG. 6B is a diagram illustrating a process of updating a physical address 302 that is stored in an L2P address indirection table, in accordance with some embodiments.

FIG. 6A is a diagram illustrating a process 600 of extracting a physical address 302 from an L2P address indirection table 230, in accordance with some embodiments, and FIG. 6B is a diagram illustrating a process 650 of updating a physical address 302 that is stored in an L2P address indirection table 230, in accordance with some embodiments. A sequence of physical addresses 302 are stored according to a predefined data structure (e.g. 510 in FIG. 5B) in the L2P address indirection table 230 (FIG. 2). The sequence of physical addresses 302 includes physical addresses 302A-1, 302B-1, 302B-1, 302A-2, 302B-2, 302C-2, . . . , 302A-N, 302B-N, and 302C-N (FIG. 5A), and every three successive physical addresses of the sequence of physical addresses 302 are grouped into physical address sets 502-1, 502-2, . . . , and 502-N (FIG. 5A). Each physical address set 502 is stored in the L2P address indirection table 230 according to the predefined data structure 510 (FIG. 5B). Each physical address 302 is separated to a set of MSBs and a set of LSBs 314. For each physical address set 502, a set of data bits 312 is determined based on a plurality of MSB sets including the set of MSBs of each of the physical addresses 302 of the physical address set 502, and different sets of LSBs 314 are stored jointly with the set of data bits 312. For example, for the physical address set 502-1, three sets of LSBs 314A-1, 314B-1, and 314C-1 are stored successively and immediately followed with a set of data bits 312-1, which is a combination of the MSBs of the physical addresses 302A-1, 302B-1, and 302C-1.

Referring to FIG. 6A, in some embodiments, a request is received to extract a first physical address 302 from the L2P address indirection table 230. In some situations, the request includes an identifier of the first physical address 302 (e.g., 302C-1 in FIG. 5A). Alternatively, in some situations, the request includes an identifier of a first logic address (e.g., logical address 3 in FIG. 5A), and the first physical address 302C-1 corresponds to the first logic address and is extracted in response to the request. The predefined data structure 510 is known. In response to the request, a controller 202 of a memory system 200 identifies (operation 602) a first set of LSBs 314C-1 and (operation 604) a first set of data bits 312-1 that are associated with the first set of LSBs 314C-1 in the L2P address indirection table 230 based on the first physical address 302C-1. The controller 202 further determines (operation 606) a first set of MSBs M3 based on the first set of data bits 312-1, e.g., in accordance with a predefined lookup table 316 or equation 318. The first set of MSBs M3 and the first set of LSBs 314C-1 are combined (operation 608) to determine the first physical address 302C-1 corresponding to the first logical address.

Referring to FIG. 6B, in some embodiments, a request is received to modify a first physical address 302C corresponding to a first logical address in the L2P address indirection table 230. The first physical address 302C is modified to a new physical address 652. In some situations, the request includes an identifier of the first physical address 302 (e.g., 302C-1 in FIG. 5A). Alternatively, in some situations, the request includes an identifier of a first logic address (e.g., logical address 3 in FIG. 5A), and the first physical address 302C-1 corresponds to the first logic address and is modified to the new physical address 652 in response to the request.

The predefined data structure 510 is known. In response to the request, the controller 202 identifies (operation 654) a set of modified MSBs M3' and a set of modified LSBs 656 of a modified first physical address (i.e., the new physical address 652). Based on the first physical address 302C-1, the controller 202 identifies a first set of LSBs 314C-1 and a first set of data bits 312-1 that are associated with the first set of LSBs 314C-1 in the L2P address indirection table 230. The first set of LSBs 314C-1 is replaced (operation 658) with the set of modified LSBs 656 in the L2P address indirection table 230. The first set of data bits 312-1 is modified (operation 660) in the L2P address indirection table 230 based on the set of modified MSBs M3'.

Further, in some embodiments, based on the first physical address 302C-1, the controller 202 extracts the set of data bits 312-1 that are associated with the physical address set 502-1 including the first physical address 302C-1 from the L2P address indirection table 230. The plurality of MSB sets M1, M2, and M3 are determined (operation 662) from the extracted set of data bits 312-1. The controller 202 replaces (operation 664) a first set of MSBs M3 corresponding to the first physical address 302C-1 in the plurality of MSB sets with the set of modified MSBs M3', thereby generating a plurality of updated MSB sets. The controller 202 modifies the set of data bits 312C-1 based on the plurality of updated MSB sets including the set of modified MSBs M3', e.g., in accordance with a predefined lookup table 316 or equation 318. The modified set of data bits is stored (operation 666) in place of the set of data bits 312C-1 that are associated with the physical address set 502 in the L2P address indirection table 230.

Figure 7:
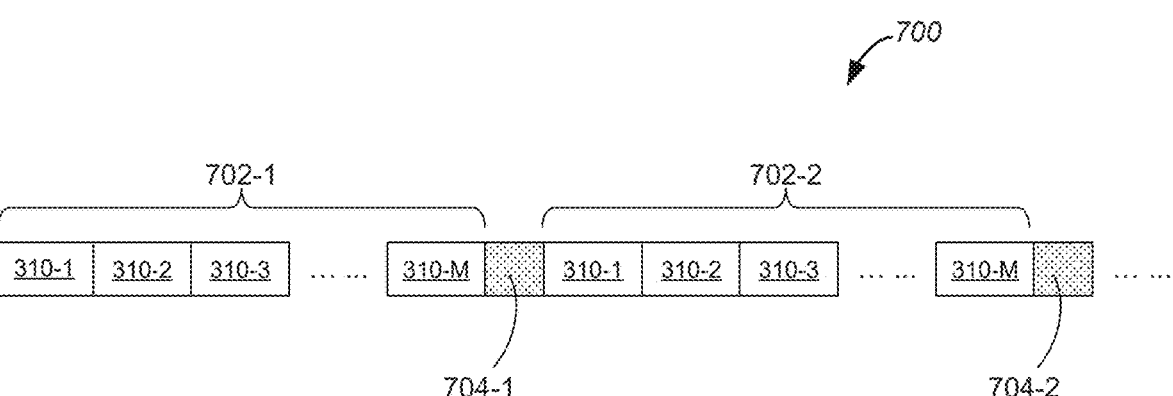
FIG. 7 is a diagram of an example data structure of an L2P address indirection table including integrity data, in accordance with some embodiments.

FIG. 7 is a diagram of an example data structure 700 of an L2P address indirection table 230 including integrity data, in accordance with some embodiments. As explained above, a plurality of physical addresses 302 are grouped and stored jointly as compressed address data 310 in the address indirection table 230. In some embodiments (FIGS. 3A and 3B), 2 physical addresses 302A and 302B are stored jointly as a set of compressed address data 310. In some embodiments (FIGS. 4A and 4B), 3 physical addresses 302A-302C are stored jointly as a set of compressed address data 310. Further, a plurality of sets of compressed address data 310 are grouped to a cluster 702 (e.g., 702-1, 702-2) and stored successively in the address indirection table 230. An integrity data item 704 (e.g., 704-1, 704-2) is generated from, and stored jointly with, the cluster 702. For example, a cluster 702-1 includes an integer number (M) sets of compressed address data 310-1, 310-2, . . . , and 310-M, and an integrity data item 704-1 is generated from and stored with the compressed address data 310-1, 310-2, . . . and 310-M.

In some embodiments, the cluster 702 and the integrity data item 704 are stored in a DRAM module 212B, and accessed based on a burst length (e.g., equal to 64 bytes (512 bits)). In some embodiments, each set of compressed address data 310 has 67 bits (FIG. 3B), and the cluster 702 includes 7 sets of compressed address data 310 and a 34b physical address. The integrity data item 704 has 8 or 9 bits (e.g., at least 1 byte). Alternatively, in some embodiments, each set of compressed address data 310 has 67 bits (FIG. 3B), and the cluster 702 includes 15 sets of compressed address data 310. The integrity data item 704 has 16-19 bits (e.g., at least 2 bytes). The cluster 702 and the integrity data item 704 are accessed via two burst reads or two burst writes. In some embodiments, each set of compressed address data 310 has 100 bits (FIG. 4B), and the cluster 702 includes 5 sets of compressed address data 310. The integrity data item 704 has 8-12 bits (e.g., at least 1 byte). The cluster 702 and the integrity data item 704 are accessed via a burst read or write. Alternatively, in some embodiments, each set of compressed address data 310 has 100 bits (FIG. 4B), and the cluster 702 includes 10 sets of compressed address data 310. The integrity data item 704 has up to 24 bits (e.g., 3 bytes). The cluster 702 and the integrity data item 704 are accessed via two burst reads or writes.

In some situations, the memory system 200 has a memory capacity of 32 TB, and each memory sector that is individually addressable includes 4 KB memory cells. The memory system 200 are addressed by 8 billion unique 34b physical addresses 302, which are stored in the address indirection table 230 in the DRAM module 212B of the memory system 200. Each DRAM codeword is stored with ECC parity data. In some embodiments, 4 DDR5 DRAM dies with 8-bit wide channel interfaces are coupled to a controller 202 in parallel in the memory system 200. A minimum burst length is 16, and a corresponding memory access size is equal to 512 bits (i.e., 64 bytes). Further, in some embodiments, every 128 bytes of payload data is stored with 2 bytes of ECC parity data. 30 physical addresses are stored at a cost of 4.33 bytes per physical address 302, and 3 DRAM reads or writes are needed for each memory access. Alternatively, in some embodiments, every 126 bytes of payload is stored with 2 bytes of ECC parity data. 29 physical addresses are stored at a cost of 4.41 bytes per physical address 302, and 2 DRAM reads or writes from are needed for each memory access.

Additionally, in some embodiments, every physical address 302 is stored with 33.5 bits on average (i.e., saves 0.5 bits per byte), and the 126 bytes of payload and 2 bytes of ECC parity are applied. 30 physical addresses 302 are stored at a cost of 4.27 byte per physical address 302. This has a lower cost to store the physical addresses 302 and allows the controller 202 to use only 2 DRAM reads or writes. In some embodiments, every physical address 302 is stored with 33.333 bits on average (i.e., saves 0.667 bits per byte), and 2 bytes of ECC parity data is reduced to a 10-bit single error correction/double error detection (SECDED) byte. For 62.75 bytes of payload and 1.25 bytes of ECC parity, 15 physical addresses 302 are used at a cost of 4.27 bytes per physical address. This has a low cost to store the physical addresses 302 and allows us to use only 1 DRAM read or write. Alternatively, in some embodiments, a 64-byte cache 212A inside the SSD controller 202 is applied to store the physical addresses of the address indirection table 230.

FIG. 8 is a flow diagram of a method 800 for compressing addresses stored in an L2P address indirection table 230, in accordance with some embodiments. The method 800 is implemented at an electronic device including the memory system 200 (FIG. 2). The electronic device determines (operation 802) a plurality of physical addresses 302 corresponding to an ordered sequence of logical addresses, and each logical address corresponds to a distinct physical address 302. The electronic device identifies (operation 804) a set of most significant bits (MSBs) and a set of least significant bits (LSBs) 314 of each of the plurality of physical addresses 302, and determines (operation 806) a set of data bits 312 based on a plurality of MSB sets including the set of MSBs of each of the plurality of physical addresses 302. The electronic device stores (operation 808) the set of LSBs 314 of each of the plurality of physical addresses 302 and the set of data bits 312 jointly in a logical-to-physical (L2P) address indirection table 230, e.g., according to a data structure.

In some embodiments, the set of data bits 312 (operation 810) has a number of bits that is less than a total number of bits in the MSBs in the plurality of physical addresses 302.

In some embodiments, for each of the plurality of physical addresses 302, the set of MSBs has a first number of bits, and the set of LSBs 314 has a second number of remaining bits distinct from the set of MSBs in the respective address 302. In other words, the set of MSBs and the set of LSBs 314 are complementary to each other for the respective physical address, and a sum of the first number and the second number is equal to the total number of bits in each physical address. Further, in some embodiments, the first number remains (operation 812) the same, and the second number remains the same for the plurality of physical addresses 302.

In some embodiments, the plurality of physical addresses 302 includes at least a first physical address 302A and a second physical address 302B (FIG. 3A). The first physical address 302A has a first set of MSBs M1, and the second physical address 302 has a second set of MSBs M2. A number of data bits in the first set of MSBs is distinct from a number of data bits in the second set of MSBs. In other words, the first number varies (operation 814) among different physical addresses 302.

In some embodiments, the electronic device determines the set of data bits 312 based on the plurality of MSB sets (e.g., M1 and M2 in FIGS. 3A and 3B) by identifying a lookup table 316, identifying a combination of the plurality of MSB sets in the lookup table 316, and checking (operation 816) the lookup table 316 to determine the set of data bits 312 based on the combination of the plurality of MSB sets. In some embodiments, the electronic device determines the set of data bits 312 based on the plurality of MSB sets (e.g., M1 and M2 in FIGS. 3A and 3B) by identifying a predefined equation 318, determining a plurality of input values based on the plurality of MSB sets, determining (operation 818) an output value based on the predefined equation and the plurality of input values, and determining the set of data bits 312 from the output value. Further, in some embodiments, a controller 202 of the memory system 200 includes compression and decompression logic having adders, multipliers, lookup tables, and dividers, and modular operators. The controller 202 is configured to apply the lookup table 316 or the predefined equation 318.

In some embodiments, the plurality of physical addresses 302 include a first physical address 302C-1 (FIG. 5A) corresponding to a first logical address. The electronic device receives a request to extract the first physical address 302 corresponding to the first logical address from the L2P address indirection table 230. In response to the request (FIG. 6A) and based on the first physical address 302C-1, the electronic device identifies a first set of LSBs 314C-1 and a first set of data bits 312-1 that are associated with the first set of LSBs 314C-1 in the L2P address indirection table 230, determines a first set of MSBs M3 based on the first set of data bits 312-1, and combines the first set of MSBs M3 and the first set of LSBs 314C-1 to determine the first physical address 302C-1 corresponding to the first logical address.

In some embodiments, the plurality of physical addresses 302 include a first physical address 302C-1 corresponding to a first logical address. The electronic device receives a request to modify the first physical address 302C-1 corresponding to the first logical address in the L2P address indirection table 230. In response to the request (FIG. 6B), the electronic device identifies a set of modified MSBs M3' and a set of modified LSBs 656 of a modified first physical address 652; based on the first physical address 302C-1, identifies a first set of LSBs 314C-1 and a first set of data bits 312-1 that are associated with the first set of LSBs 314C-1 in the L2P address indirection table 230; replaces the first set of LSBs 314C-1 with the set of modified LSBs 656 in the L2P address indirection table 230; and modifies the first set of data bits 312-1 in the L2P address indirection table 230 based on the set of modified MSBs M3'.

Further, in some embodiments, based on the first physical address 302C-1, the electronic device extracts the set of data bits 312-1 that are associated with the plurality of physical addresses 302 including the first physical address 302C-1 from the L2P address indirection table 230, determines the plurality of MSB sets from the extracted set of data bits 312, replaces a first set of MSBs M3 corresponding to the first physical address 302C-1 in the plurality of MSB sets with the set of modified MSBs M3', thereby generating a plurality of updated MSB sets, modifies the set of data bits 312-1 based on the plurality of updated MSB sets including the set of modified MSBs, and stores the modified set of data bits in place of the set of data bits 312-1 that are associated with the plurality of physical addresses 302 in the L2P address indirection table 230.

In some embodiments, the electronic device includes a plurality of memory sectors, and each memory sector has a distinct physical address 302.

In some embodiments, the plurality of physical addresses 302 have (operation 820) 2 physical addresses 302A and 302B (FIGS. 3A and 3B), and the set of MSBs M1 or M2 of each of the plurality of physical addresses 302 has 4 bits. The set of data bits 312 includes 7 bits.

In some embodiments, the plurality of physical addresses 302 have (operation 822) 3 physical addresses 302A, 302B, and 302C (FIGS. 4A and 4B), and the set of MSBs M1, M2, or M3 of each of the plurality of physical addresses 302 has 3 bits. The set of data bits 312 includes 7 bits.

In some embodiments, the set of data bits 312 are stored (operation 824) immediately before the set of LSBs 314 of the plurality of physical addresses 302 in the L2P address indirection table 230 (FIG. 5C).

In some embodiments, the set of data bits 312 are stored (operation 826) immediately following the set of LSBs 314 of the plurality of physical addresses 302 in the L2P address indirection table 230 (FIG. 5B).

In some embodiments, in accordance with a predefined data structure, the set of LSBs 314 of the plurality of physical addresses 302 and the set of data bits 312 are stored (operation 828) in two separate memory regions 504 and 506 of the L2P address indirection table 230 (FIG. 5D). For example, the two separate memory regions 504 and 506 include an LSB data region and an MSB data region.

In some embodiments, the L2P address indirection table 230 is stored in a controller 202 of the memory system 200. Alternatively, in some embodiments, the L2P address indirection table 230 is stored in a DRAM module 212B that is external to a controller 202 of the memory system 200. In some embodiments, the memory system includes an SSD, and the L2P address indirection table 230 is stored in the SSD for accessing a plurality of NAND flash memory cells in the SSD.

In some embodiments, the plurality of physical addresses 302 include more than 3 physical addresses 302. In some embodiments, the set of MSBs of at least one of the plurality of physical addresses 302 has more than 4 bits.

In some embodiments, the set of LSBs 314 of each of the plurality of physical addresses 302 and the set of data bits 312 are stored as a set of compressed address data 310, and the method further includes accessing the set of compressed address data and corresponding integrity data 704 in a burst write or a burst read (FIG. 7).

It should be understood that the particular order in which the operations in FIG. 8 have been described are merely exemplary and are not intended to indicate that the described order is the only order in which the operations could be performed. One of ordinary skill in the art would recognize various ways to compressing physical addresses stored in an L2P address indirection table 230, thereby conserving memory space of a cache or a DRAM allocated to store the L2P address indirection table 230. Additionally, it should be noted that details of other processes described above with respect to FIGS. 1-7 are also applicable in an analogous manner to method 800 described above with respect to FIG. 8. For brevity, these details are not repeated here.

In some embodiments, the set of LSBs 314 of the plurality of physical addresses 302 and the set of data bits 312 are stored in a DRAM module 212B, and are monitored on a DRAM bus coupling the controller 202 to the DRAM module 212B. A data structure is detected on the DRAM bus to determine whether the method 800 is implemented on the electronic device.

Memory is also used to store instructions and data associated with the method 800, and includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 800.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method implemented at an electronic device, the method comprising:
   determining a plurality of physical addresses corresponding to a plurality of logical addresses, each logical address corresponding to a distinct physical address;
   identifying a set of first bits including one or more first bits and a set of second bits including one or more second bits in each of the plurality of physical addresses;
   determining a set of data bits based on a plurality of bit sets including the set of first bits of each of the plurality of physical addresses; and
   storing the set of second bits of each of the plurality of physical addresses and the set of data bits jointly in a logical-to-physical (L2P) address indirection table.

2. The method of claim 1, wherein the set of data bits has a number of bits that is less than a total number of first bits in the plurality of physical addresses.

3. The method of claim 1, wherein for each of the plurality of physical addresses, the set of first bits has a first number of bits, and the set of second bits has a second number of remaining bits distinct from the set of first bits in the respective physical address.

4. The method of claim 3, wherein the first number remains the same for each the plurality of physical addresses.

5. The method of claim 1, wherein:
   the plurality of physical addresses includes at least a first physical address and a second physical address;
   the first physical address has a first set of first bits, and the second physical address has a second set of first bits; and
   a number of data bits in the first set of first bits is distinct from a number of data bits in the second set of first bits.

6. The method of claim 1, wherein determining the set of data bits based on the plurality of bit sets further comprises:
   identifying a lookup table;
   identifying a combination of the plurality of bit sets in the lookup table; and
   checking the lookup table to determine the set of data bits based on the combination of the plurality of bit sets.

7. The method of claim 1, wherein determining the set of data bits based on the plurality of bit sets further comprises:
   identifying a predefined equation;
   determining a plurality of input values based on the plurality of bit sets;
   determining an output value based on the predefined equation and the plurality of input values; and
   determining the set of data bits from the output value.

8. The method of claim 1, wherein the plurality of physical addresses include a first physical address corresponding to a first logical address, the method further comprising:
   receiving a request to extract the first physical address corresponding to the first logical address from the L2P address indirection table;
   in response to the request,
   based on the first physical address, identifying a respective set of second bits and a first set of data bits that are associated with the respective set of second bits in the L2P address indirection table;
   determining a respective set of first bits based on the first set of data bits; and
   combining the respective set of first bits and the respective set of second bits to determine the first physical address corresponding to the first logical address.

9. The method of claim 1, wherein the plurality of physical addresses include a first physical address corresponding to a first logical address, the method further comprising:
   receiving a request to modify the first physical address corresponding to the first logical address in the L2P address indirection table;
   in response to the request,
   identifying a set of modified first bits and a set of modified second bits of a modified first physical address;
   based on the first physical address, identifying a respective set of second bits and a first set of data bits that are associated with the respective set of second bits in the L2P address indirection table;
   replacing the respective set of second bits with the set of modified second bits in the L2P address indirection table; and
   modifying the first set of data bits in the L2P address indirection table based on the set of modified first bits.

10. The method of claim 9, wherein modifying the first set of data bits based on the set of modified first bits in the L2P address indirection table further comprises:
   based on the first physical address, extracting the set of data bits that are associated with the plurality of physical addresses including the first physical address from the L2P address indirection table;
   determining the plurality of bit sets from the extracted set of data bits;
   replacing a respective set of first bits corresponding to the first physical address in the plurality of bit sets with the set of modified first bits, thereby generating a plurality of updated bit sets;
   modifying the set of data bits based on the plurality of updated bit sets including the set of modified first bits; and storing the modified set of data bits in place of the set of data bits that are associated with the plurality of physical addresses in the L2P address indirection table.

11. An electronic device, comprising:

one or more processors; and memory storing one or more programs for execution by the one or more processors, the one or more programs including instructions for:

determining a plurality of physical addresses corresponding to a plurality of logical addresses, each logical address corresponding to a distinct physical address;

identifying a set of first bits including one or more first bits and a set of second bits including one or more second bits in each of physical addresses;

determining a set of data bits based on a plurality of bit sets including the set of first bits of each of the plurality of physical addresses; and storing the set of second bits of each of the plurality of physical addresses and the set of data bits jointly in a logical-to-physical (L2P) address indirection table.

12. The electronic device of claim 11, wherein:

the electronic device includes a plurality of memory sectors, and each memory sector has a distinct physical address; and for each of the plurality of physical addresses, the set of first bits includes a set of most significant bits or a set of least significant bits of the respective physical address.

13. The electronic device of claim 11, wherein the plurality of physical addresses have 2 physical addresses, and the set of first bits of each of the plurality of physical addresses has 4 bits, and wherein the set of data bits includes 7 bits.

14. The electronic device of claim 11, wherein the plurality of physical addresses have 3 physical addresses, and the set of first bits of each of the plurality of physical addresses has 3 bits, and wherein the set of data bits includes 7 bits.

15. The electronic device of claim 11, wherein the set of data bits are stored immediately before the set of second bits of the plurality of physical addresses in the L2P address indirection table.

16. A non-transitory computer-readable storage medium storing one or more programs for execution by one or more processors, the one or more programs comprising instructions for:

determining a plurality of physical addresses corresponding to a plurality of logical addresses, each logical address corresponding to a distinct physical address;

identifying a set of first bits including one or more first bits and a set of second bits including one or more second bits in each of the plurality of physical addresses;

determining a set of data bits based on a plurality of bit sets including the set of first bits of each of the plurality of physical addresses; and storing the set of second bits of each of the plurality of physical addresses and the set of data bits jointly in a logical-to-physical (L2P) address indirection table.

17. The non-transitory computer-readable storage medium of claim 16, wherein the set of data bits are stored immediately following the set of second bits of the plurality of physical addresses in the L2P address indirection table.

18. The non-transitory computer-readable storage medium of claim 16, wherein in accordance with a predefined data structure, the set of second bits of the plurality of physical addresses and the set of data bits are stored in two separate memory regions of the L2P address indirection table.

19. The non-transitory computer-readable storage medium of claim 16, wherein the plurality of physical addresses include more than 3 physical addresses, and the set of first bits of at least one of the plurality of physical addresses has more than 4 bits.

20. The non-transitory computer-readable storage medium of claim 16, wherein the set of second bits of each of the plurality of physical addresses and the set of data bits are stored as a set of compressed address data, and the set of compressed address data is associated with integrity data, the one or more programs further comprising instructions for:

accessing the set of compressed address data and corresponding integrity data in a burst write or a burst read.

* * * * *